United States Patent [19]
Holden

[11] Patent Number: 6,151,301
[45] Date of Patent: *Nov. 21, 2000

[54] ATM ARCHITECTURE AND SWITCHING ELEMENT

[75] Inventor: Brian D. Holden, Sunnyvale, Calif.

[73] Assignee: PMC-Sierra, Inc., Burnaby, Canada

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/680,869

[22] Filed: Jul. 16, 1996

Related U.S. Application Data

[63] Continuation of application No. 08/439,078, May 11, 1995, Pat. No. 5,570,348.

[51] Int. Cl.[7] .............................. G06F 11/00; H04L 12/28
[52] U.S. Cl. .......................... 370/232; 370/395; 370/414
[58] Field of Search ..................................... 370/229, 230, 370/232, 235, 236, 412, 413–418, 395

[56] References Cited

U.S. PATENT DOCUMENTS 5,083,269   1/1992  Syobatake et al. ................ 370/85.6 X (List continued on next page.)

OTHER PUBLICATIONS

Input–Output–Buffered ATM Switches with Delayed Back Pressure by Badran et al., IEEE 771–774, Mar. 1993.

Badran et al., Head of Line Arbitration in ATM Switches with Input–Output Buffering and Backpressure control Globecom '91, 347–351, Jan. 1991.

Ahmadi, et al., "A Survey of Modern High–Performance Switching Techniques," *IEEE J. of Selected Areas Commun.*, pp. 1091–1103, Sep. 1989, reprinted in *Performance Evaluation*, pp. 4–16.

Alles, "Tutorial: ATM in Private Networking,"*Hughes LAN Systems*, 1993.

Chen, et al., "Performance Sutdy of an Input Queuing Packet Switch with Two Priority cases," *IEEE Trans. Commun.*, pp. 117–126, Jan. 1991, reprinted in *Performance Evaluation*, pp. 99–107.

Fujitsu (pub.), *Asynchronous Transfer Mode: IC's for ATM*, 1993.

IEEE Press (pub.), *Performance Evaluation of High Speed Switching Fabrics and Networks*, Robertazzi (ed.), pp. 1–3, 251–252, 1993.

Karol, et al., "Input Versus Output Queuing on a Space Division Packet Switch," *IEEE Trans. Commun.*, pp.1347–1356, Dec. 1987, reprinted in *Performance Evaluation*, pp. 59–68.

Kim, et al., "Call Scheduling Algorithms in a Multicast Switch," *IEEE Trans. Commun.*, pp. 625–635, Mar. 1992, reprinted in *Performance Evaluation*, pp. 290–299.

*Primary Examiner*—Chau Nguyen
*Assistant Examiner*—Phuongchau Ba Nguyen
*Attorney, Agent, or Firm*—Townsend & Townsend and Crew LLP; Kenneth R. Allen

[57] ABSTRACT

An ATM switching system architecture of a switch fabric-type is built of, a plurality of ATM switch element circuits and routing table circuits for each physical connection to/from the switch fabric. A shared pool of memory is employed to eliminate the need to provide memory at every crosspoint. Each routing table maintains a marked interrupt linked list for storing information about which ones of its virtual channels are experiencing congestion. This linked list is available to a processor in the external workstation to alert the processor when a congestion condition exists in one of the virtual channels. The switch element circuit typically has up to eight 4-bit-wide nibble inputs and eight 4-bit-wide nibble outputs and is capable of connecting cells received at any of its inputs to any of its outputs, based on the information in a routing tag uniquely associated with each cell.

4 Claims, 13 Drawing Sheets

U.S. PATENT DOCUMENTS

| | | | |
|---|---|---|---|
| 5,099,475 | 3/1992 | Kozaki et al. | 370/60 |
| 5,144,619 | 9/1992 | Munter | 370/60.1 |
| 5,233,606 | 8/1993 | Pashan et al. | 370/418 |
| 5,280,470 | 1/1994 | Buhrke et al. | 370/232 |
| 5,285,444 | 2/1994 | Sakurai et al. | 370/60 |
| 5,313,454 | 5/1994 | Bustini et al. | 370/236 |
| 5,317,561 | 5/1994 | Fischer et al. | 370/60.1 X |
| 5,325,356 | 6/1994 | Lyles | 370/60 |
| 5,367,520 | 11/1994 | Cordell | 370/395 |
| 5,493,566 | 2/1996 | Ljungberg et al. | 370/395 |
| 5,570,348 | 10/1996 | Holden | 370/236 |

| Priority 0 | From-VPC-19 | From-VPC-21 | From-VPC-21 |
|---|---|---|---|
| Priority 1 | | | |
| Priority 2 | From-VPC-22 | From-VPC-22 | |
| Priority 3 | | | |
| Priority 4 | From-VPC-23 | | |

Fig. 16

Per VC Count of Queued Cells

| VPC | Queued Cells |
|---|---|
| 18 | 0 |
| 19 | 1 |
| 20 | 0 |
| 21 | 2 |
| 22 | 2 |
| 23 | 1 |
| 24 | 0 |
| 25 | 0 |
| ... | |

Fig. 17

ATM ARCHITECTURE AND SWITCHING ELEMENT

This is a continuation of application No. 08/439,078 filed May 11, 1995, now U.S. Pat. No. 5,570,348.

BACKGROUND OF THE INVENTION

This invention relates to a class of digital communication systems known as asynchronous transfer mode (ATM) switching systems and generally to intercomputer communications architectures. More particularly, this invention relates to switch fabric-type architecture of an ATM switching element. The invention is not to be confused with a bus-type architecture of an ATM switching element. This invention is useful in telecommunications systems which require real-time routing and switching of digitized cells of data. A particular application is in the field of ISDN data switching at telephone central offices.

There is a need for high-speed switching and throughput in a telecommunications switch for digital communication applications wherein the primary usage is switching data between an external source or input resource and an external output or destination resource. Two types of architectures are known: bus architectures and switch-fabric architectures. Bus architectures provide multiple-point-to-multiple-point connections. Switch fabric architectures provide single-point-to-single-point connections.

A building block in a switch-fabric architecture ATM switch system is a structure known as a switch element. A switch element provides packet signal routing from one of a plurality of input ports to one or more of a plurality of output ports by maintaining an array of crosspoints for connecting any input port to any output port. Switch elements may be aggregated in various patterns to provide an arbitrarily large N by N possible interconnections of input ports to output ports, each via a unique path.

Problems arise where the receiving port cannot assimilate information as fast as it is delivered or where the priority of the traffic varies. A "brute-force" technique for handling the queuing problem is to provide sufficient data storage at each possible crosspoint in the switch element wherein if the amount of data accumulated at the crosspoint exceeds capacity of the data storage, data is discarded, thus forcing the destination port to request that data be resent. Such a solution is offered in the ATM self-routing switch element Model MB86680, an integrated circuit available from Fujitsu Microelectronics, Inc. of San Jose, Calif. A representation of this prior art switch element 1 is shown in FIG. 1. The element has a number of input terminals I1 to In (3, 5, 7) connected via crosspoints 31–39 to a number of output terminals O1 to On (9, 11, 13) through buffer memories 2, 4, 6, 8, 10, 12, 14, 16, and 18. The solution employed by prior art switch element 1 is very wasteful of crosspoint memory because each memory element is connected to just one crosspoint. Memory element 6, for example, can only store and buffer data traveling from input In to output O1. Depending on packet traffic through the switch element 1, memory at many of the crosspoints in the switch element 1 will not be needed, while at high traffic crosspoints more memory will be required than is provided in the switch element 1, and data packets will therefore have to be discarded. Discarding data packets is extremely wasteful of network resources because of the time and processing involved in the destination element requesting that the data packet be resent, and the subsequent retransmission of the data packets by the source element.

What is needed is an architecture and switching element that optimally uses available memory for queuing and buffering data packets at high-traffic crosspoints without slowing switching operations.

SUMMARY OF THE INVENTION

According to the invention, an ATM switching system architecture of a switch fabric-type comprises two different types of components, namely, a plurality of ATM switch element circuit means which make up the switch fabric, and a routing table circuit means for each physical connection from the switch fabric to a workstation. In a specific embodiment of the invention, these two components are contained in two separate integrated circuit packages and there is a shared pool of memory.

The routing table circuit means of the present invention is by way of example a self-contained circuit that is operative to receive standard 53-byte ATM packets or cells from a source on up to 2048 "virtual Channels" defined by a header of an ATM packet. A standard ATM cell has 48 bytes of data and a 5-byte header which defines the source, destination, and priority of the cell. The routing table circuit means is operative to implement a routing table that uses the address field in the header of the ATM packet to look up the intended address in its RAM. The routing table then adds a six-byte routing tag to the cell and causes the resultant cell to be output to the switch fabric. The routing tag determines the exact path the cell is to take through the switch fabric and also specifies other characteristics about the cell, such as its priority and its type, i.e., whether or not it is a multicast cell being transmitted to more than one output. The routing table is also used to control a queuing function in which queued cells are stored in an accompanying SRAM before-being placed on the switch fabric.

According to the invention, there is one routing table for each physical connection into the switch fabric. The routing table maintains a marked interrupt linked list for storing information about which ones of its virtual channels are experiencing congestion. This linked list is available to a processor in the external workstation to alert the processor when a congestion condition exists in one of the virtual channels.

A specific switch element circuit according to the present invention is a circuit that has eight 4-bit-wide nibble inputs and eight 4-bit-wide nibble outputs and is capable of connecting cells received at any of its inputs to any of its outputs, based on the information in a routing tag uniquely associated with each cell. A switch fabric-based architecture built according to the present invention includes a plurality of switch element circuit means interconnected together in any number of known network wiring configurations such as the Clos Network, Delta Network, or Reversed Delta Network.

A switch element circuit means of the present invention includes a shared cell buffer pool. The shared cell buffer pool is a memory shared by all of the inputs to the switch element and connected to all of the outputs. The shared cell buffer pool memory provides a similar function to the crosspoint memories of prior art circuits but is far more efficient and flexible because of its unique design. The switch element further includes an input controller connected to input crosspoints, an output controller connected to output crosspoints, and a multi-priority buffer pool controller (MPBPC). All cells passing through the switch element are written into the cell buffer pool during a first cell cycle, which is equivalent to 118 clock cycles. Cells may be sent to a switch element output during the next cell cycle, or if the destination output of the cell is not available, the cell may remain in the buffer pool for several cell cycles before being connected to the switch element output. The MPBPC reads tags from the input controller and directs the storage of cells in the cell buffer pool. The MPBPC also, through the output controller, directs when cells are read out of the cell buffer pool and sent to the output lines through the output I/O crosspoints. The MPBPC includes circuitry for generating and responding to back-pressure signals generated when a receiving channel cannot receive data at a rate fast enough to keep up with the transmitter. The back-pressure signals first notify the routing table, and then the workstation to which it is attached, to halt data transmission to allow the receiver an opportunity to catch up with the transmitted data stream. The back-pressure signal handling circuitry allows the switch element of the present invention to be employed in "closed-loop" ATM systems that can maximize data throughput through the switch without losing cells.

The switch element also has a single bit per set of four inputs and per set of four outputs, known as an aggregate bit that, when set, directs the switch element to treat the four inputs as one input for the purposes of routing and FIFO queuing. The MPBPC of the switch element also supports proportional bandwidth queuing, which ensures that virtual channels that are assigned to different bandwidths receive a fair share of the available bandwidth in proportion to other channels.

In accordance with one aspect of the invention, the switch elements and routing tables support multicast transmission. During multicast transmission, data from one source is distributed to several destinations, i.e., the multicast group, which comprise some, but not necessarily all, of the possible switch fabric outputs. An example of such an application is a video conference over a network in which several workstations are connected by a switch fabric, and voice and image data are transmitted from each workstation to each of the other workstations.

In accordance with one aspect of the invention, each switching element conserves available cell memories and thereby avoids dropping cells by issuing back-pressure commands to inputs on a per-input, per-priority basis to halt the flow of cells having a given priority from a given input. Back-pressure is asserted for a given input and given priority whenever the number of currently enqueued cells of the given priority supplied by the given input exceeds a predetermined threshold. Back-pressure for a given priority is asserted for all inputs whenever the number of available cell memories falls below a threshold associated with that priority.

The invention will be better understood upon reference to the following detailed description taken in conjunction with the accompanying drawings.

BRIEF DESCRIPTION OF THE DRAWINGS

FIG. 16 is a tabular illustration of per-priority queuing with per VPC cell counts in a routing table according to the invention.

FIG. 17 is a tabular illustration of a per VC count of queued cells according to the invention.

DESCRIPTION OF SPECIFIC EMBODIMENTS
SWITCH FABRIC

Figure 1:
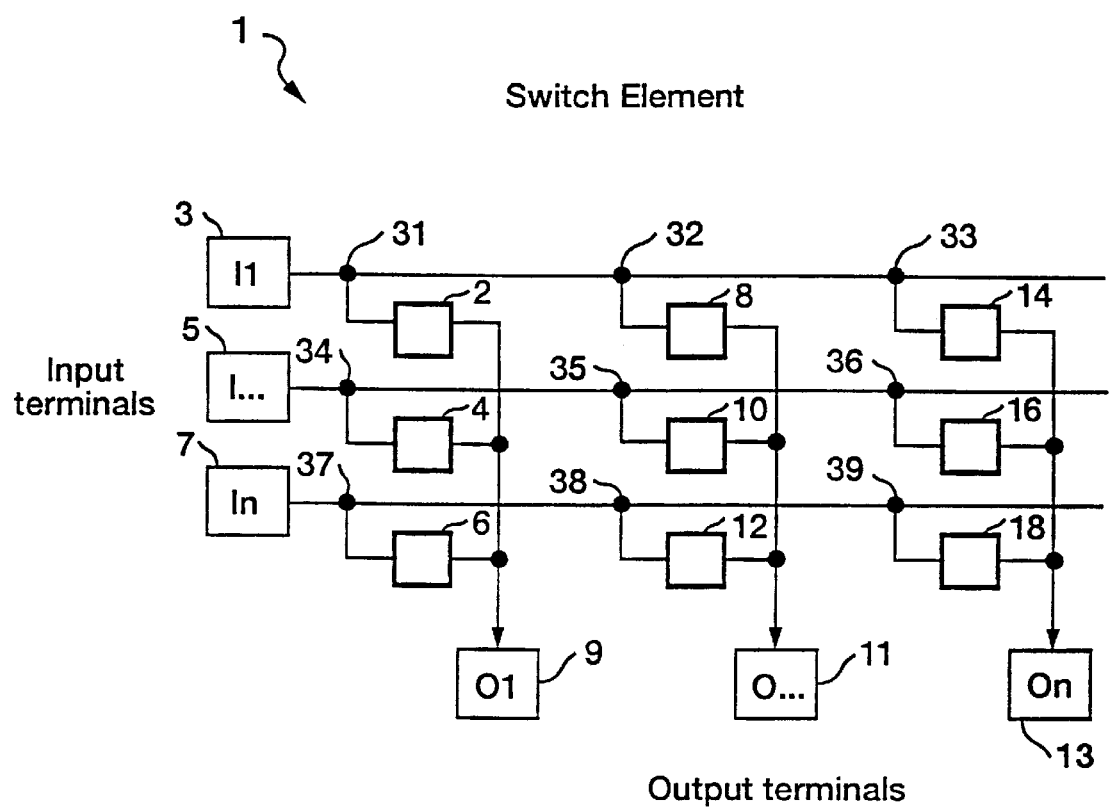
FIG. 1 is a block diagram of a prior art ATM switch element of an ATM switch fabric architecture.
Figure 2:
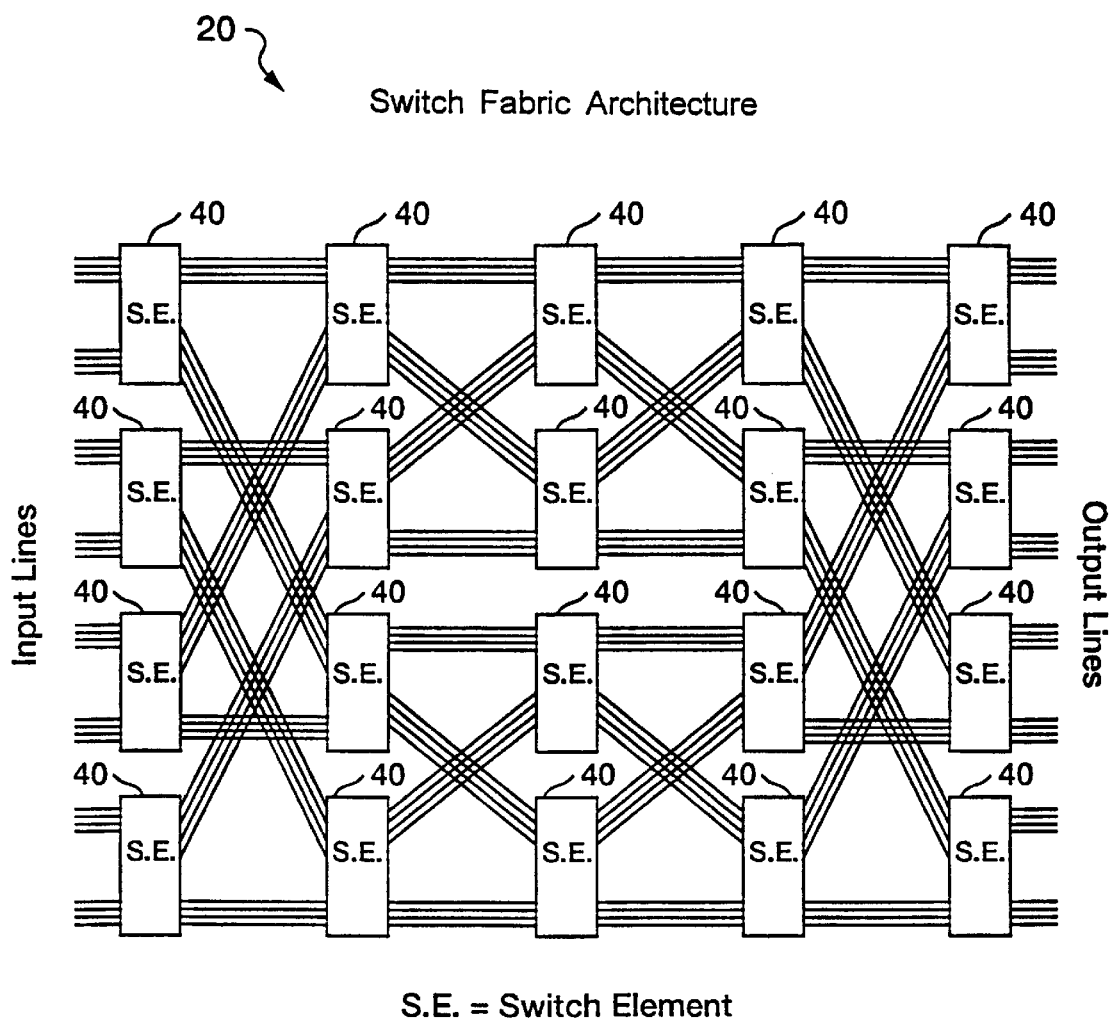
FIG. 2 is a block diagram of an ATM switch fabric architecture implemented in accordance to the invention.

FIG. 2 is a block diagram of an ATM switch fabric architecture 20 according to the invention. Shown in the figure is a 4×5 array of switch element circuit blocks (SE) 40. Each switch element 40 accepts eight 4-bit-wide input lines and has eight 4-bit-wide output lines. The switch fabric 20 thus has a total of thirty-two 4-bit-wide input lines shown at the left side of the switch fabric 20. In an operating switch, each of these thirty-two four-bit-wide input lines is connected from a separate routing table circuit, and each such routing table circuit is connected to a workstation or other digital device. The switch fabric has thirty-two four-bit-wide output lines shown at the right side of the figure. Each of the output lines is connected to individual further routing table circuits, each of which is connected to a workstation. Thus the switch fabric shown in FIG. 2 may provide a physical connection to up to thirty-two workstations and may connect data from any one of those thirty-two workstations to any other one of those or other thirty-two workstations.

It will be seen that the interconnections among the switch elements 40 are such that data entering any one of the switch fabric input lines may be routed to any one of the switch fabric output lines after passing through a total of four stages of switch elements. The switch fabric architecture 20 as shown in FIG. 2 is known as a Reversed Delta Network architecture. The switch element circuits of the present invention may be used in any number of other known network wiring configurations such as the Clos network or the Delta network, and the switch array may be expanded to provide any number of input lines and any number of output lines. (Not shown in FIG. 2 is a configuration bus connected to each one of the switch elements. The configuration bus is used by a configuration processor of the switch system to set up a number of switch parameters in a memory in the switch element.)

Figure 3:
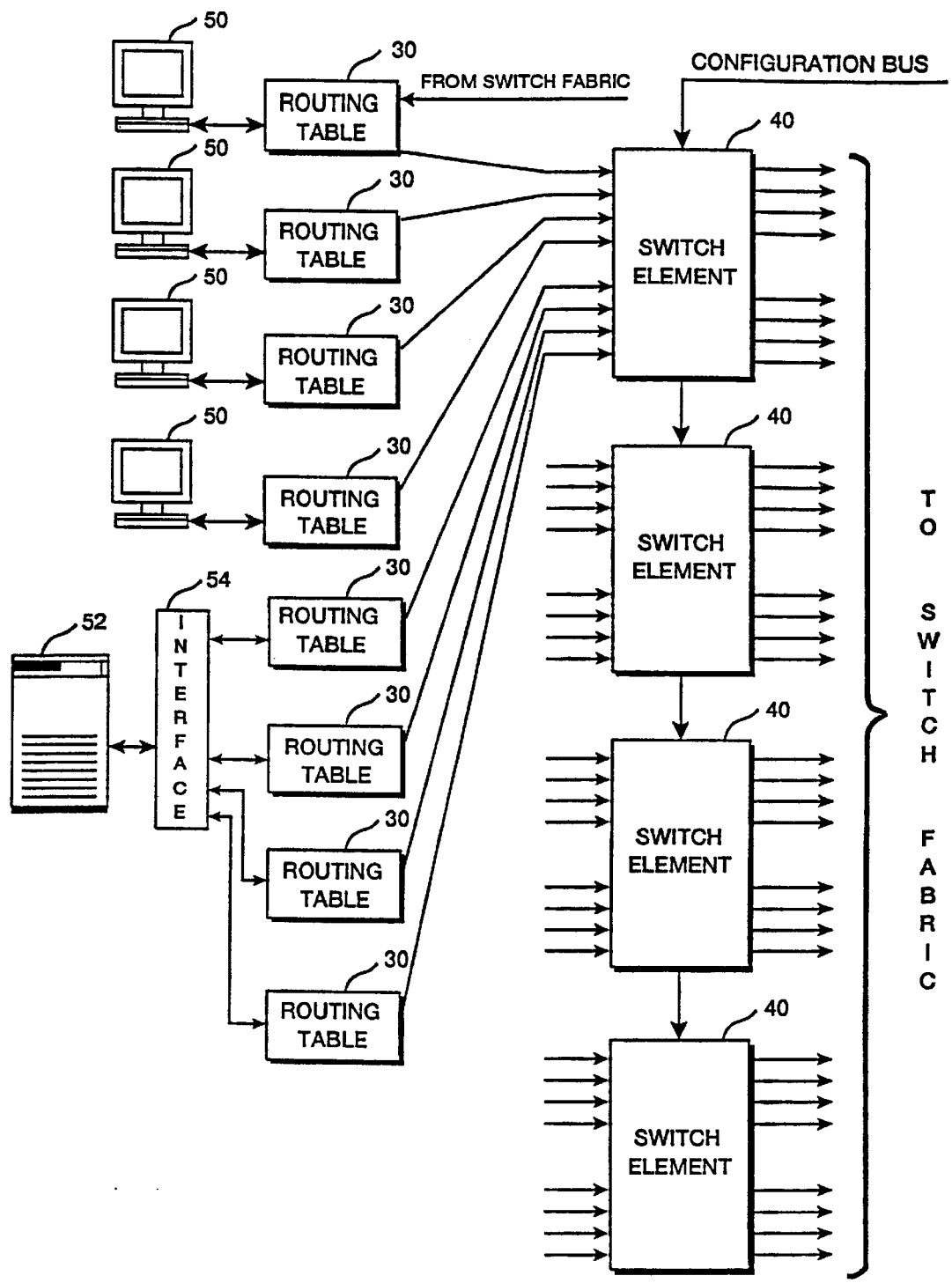
FIG. 3 is a block diagram illustrating an example of a portion of a switch fabric architecture with ATM routing table circuits and switch element circuits configured according to the invention in an ATM switch fabric architecture.

FIG. 3 shows a portion of a switch fabric made up of four switch elements 40. One of the switch elements is shown with interconnections through eight routing tables 30, to a number of workstations 50, and to a server computer 52. As shown in the figure, in a typical application for the present invention, each input to a switch fabric is connected to a routing table circuit 30. A routing table circuit 30 is typically connected to some type of digital workstation 50, which may transmit and receive voice, video, and digital data via the switch fabric.

Also shown in FIG. 3 is an aggregate input connection to a switch element in accordance with one specific embodiment of the invention. In an aggregate connection, four of the input lines of the switch fabric are grouped together and act as one input to receive and transmit data to a high-speed data device such as server computer 52. With the aggregate input feature according to the invention, the same switch element and switch fabric can handle two speeds of packet data, the first speed being the speed of one input line and the second speed being four times faster or the speed of the aggregated input lines.

ROUTING TABLE

Figure 4:
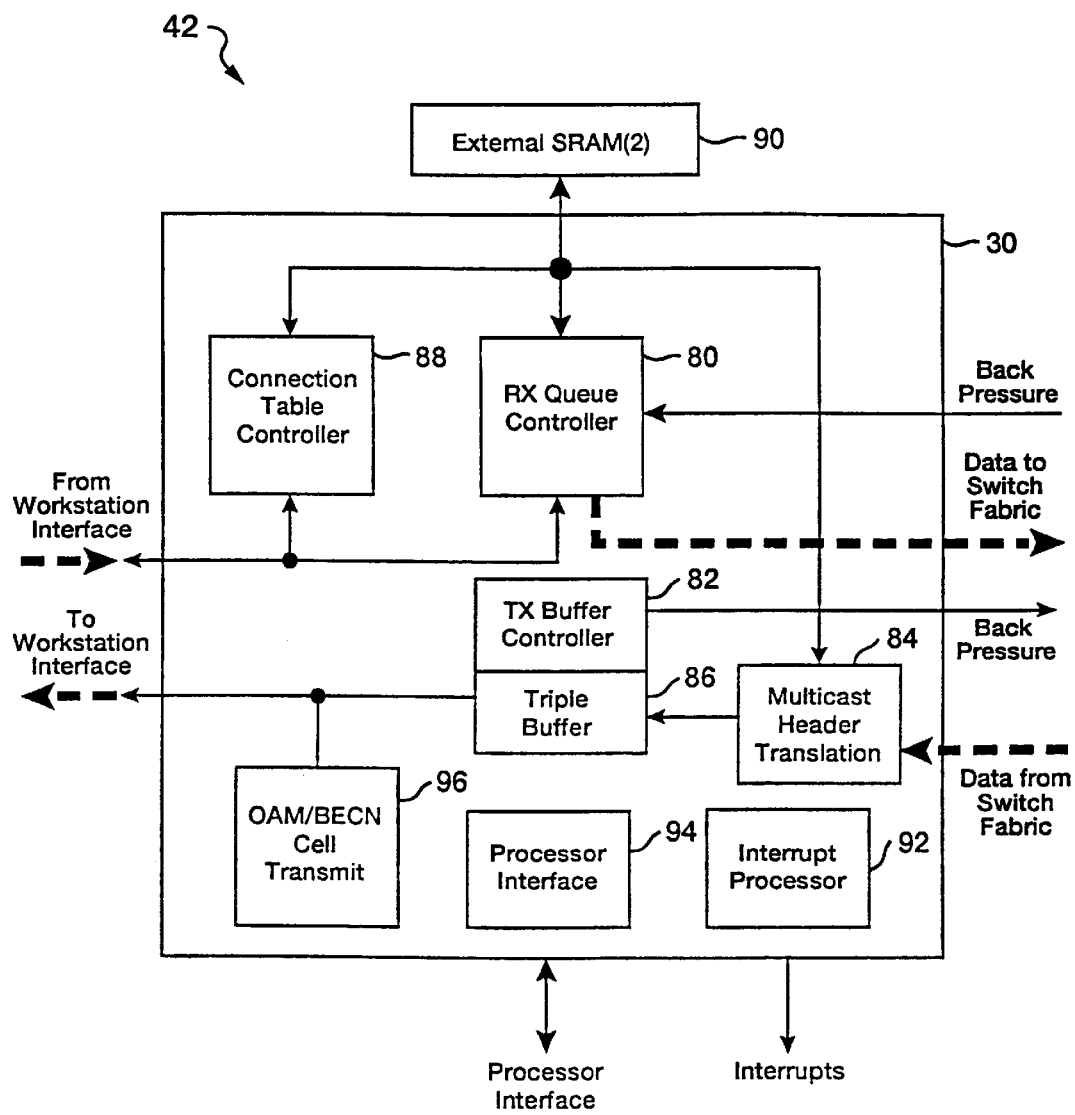
FIG. 4 is a block diagram of an ATM switch element circuit with external SRAM according to the invention.

FIG. 4 is a block diagram of a routing table circuit 42 according to the present invention. The routing table circuit 42 is a combination storage and control device that is used with external memory, e.g., SRAM 90, and includes a receive queue controller 80 which sends data to the switch fabric and receives a back-pressure signal from the switch fabric, and a transmission buffer controller 82 which receives data from the switch fabric after that data has been processed by the multicast header translation circuit 84 and asserts back pressure to the switch fabric. The transmission buffer controller 82 also includes a small buffer memory 86 for storing cells received from the switch fabric. A further controller, called a connection table controller 88, is for reading header information from the workstation interface and is operative to use that header information to add an appropriate switch tag to the cells before they are transmitted to the switch fabric. Controller 88 stores information about switch tags and buffers data in external SRAM 90. Further included are an interrupt processor 92 and processor interface 94, which are for sending control signals. to the workstation. Optionally included is an OAM/BECN cell transmit circuit 96 for inserting control cells to the outgoing data stream.

The routing table circuit 42 in each instance operates by receiving one 8-bit-wide segment of data via connection from a workstation as input and provides one 8-bit-wide workstation output. The routing table includes one 4-bit output to the switch fabric and receives one 4-bit input from the switch fabric.

SWITCH ELEMENT

Figure 5:
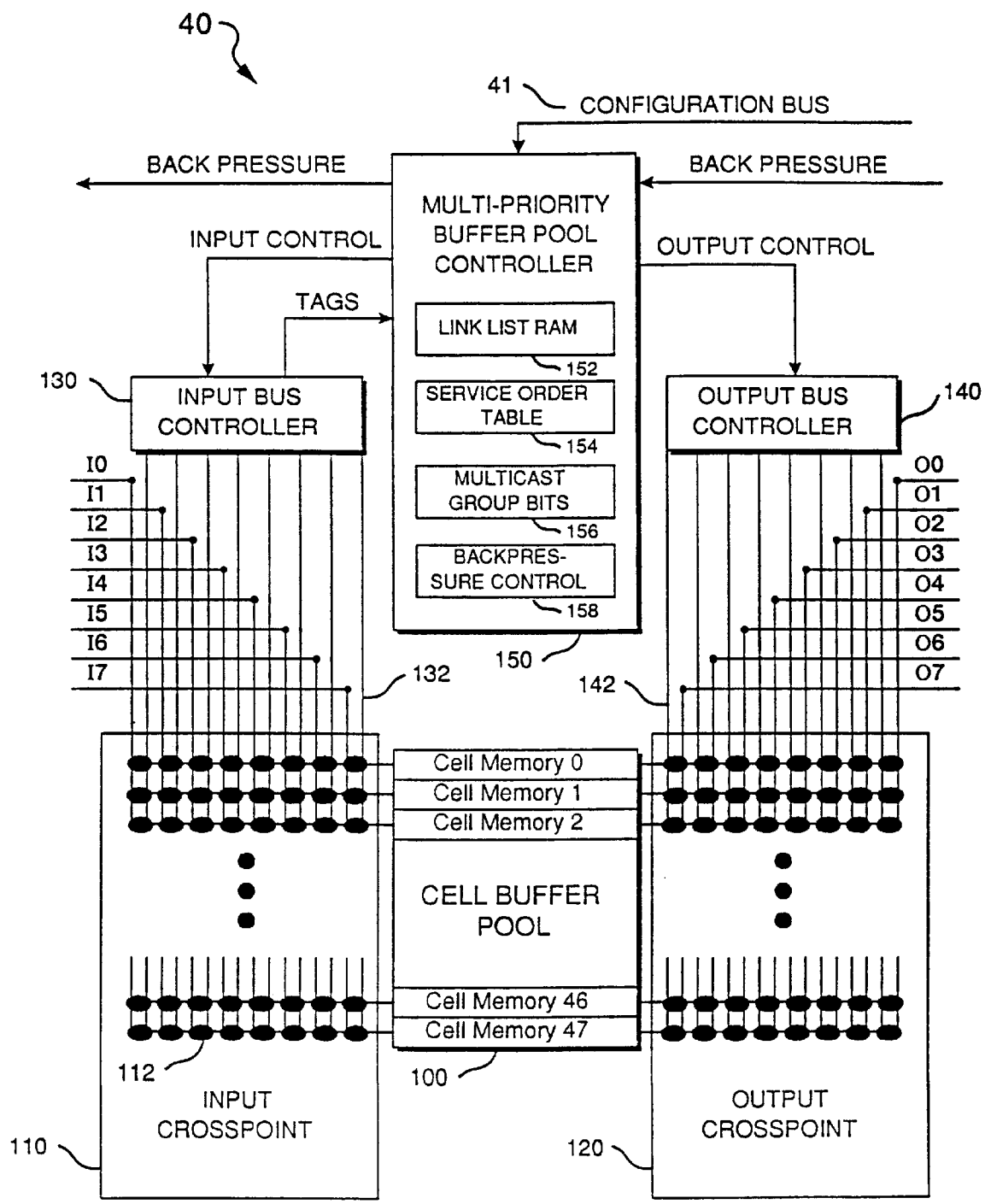
FIG. 5 is a block diagram of an ATM switch element circuit with a cell buffer pool according to the invention.

FIG. 5 is a block diagram of the structure of switch element circuit 40 according to the present invention. The switch element circuit 40 includes a very small cell buffer pool memory 100 for storing and queuing cells being transmitted through the switch element, input I/O crosspoint block 110 for connecting any input line to any cell memory in the cell buffer pool, output I/O crosspoint block 120 for connecting any output line to any cell memory in the cell buffer pool, input bus controller 130 for controlling data flow on the input bus to the cell memories, output bus controller 140 for controlling data flow from the cell memories to the output lines, and multipriority buffer pool controller (MPBPC) 150 for controlling assignment of cell memories to connections defined by the cross-point blocks. The switch element circuit 40 is connected to a configuration bus 41 which supplies configuration data to controller 150.

The switch element 40 has eight input interfaces, labeled I0 through I7, and eight output interfaces, labeled O0 through O7. Each of the eight inputs and eight outputs is a four-bit or nibble-wide interface capable of operating at for example up to 50 Mhz, i.e., sufficient to support digital communications at the current ATM OC-3 standard. Each of the inputs receives cells from another switch element in the switch fabric or from a routing table, as previously outlined. ATM cells of data are transferred as one hundred and eighteen four-bit nibbles. This allows the standard fifty-three ATM byte cells to be transferred along with six overhead bytes. A cell start signal goes high every one hundred and eighteen clock cycles to indicate the start of a cell.

Cell buffer pool 100 is a pool of random access memory. The pool contains thirty-two individual cell memories, each capable of storing an entire cell of one hundred and eighteen nibbles. The thirty-two memories can be connected to any one of the eight inputs by input crosspoint block 110 which is controlled by input bus controller 130. crosspoint block 110 contains a plurality of multiplexers 112 for connecting input buses to any of the cell memories. Multiplexers 112 are controlled by signals from the input bus controller 130 that are transmitted on six-bit wide connection control bus lines 132.

Any of the cell memories may be connected to any of the output lines via output crosspoint block 120. Output crosspoint block 120 is controlled by the output bus controller 140 via output connection control bus lines 142.

MPBPC 150 contains a link list RAM 152 for storing queue assignment information about the cell buffer pool memories, a service order table 154 for controlling the service order of the proportional bandwidth queues, a memory for multicast group bits 156 for storing information about multicast cell transmission, and a back-pressure control circuit 158 for asserting multipriority back-pressure on the eight back-pressure lines of the switch element.

LINKED LISTS

Figure 6:
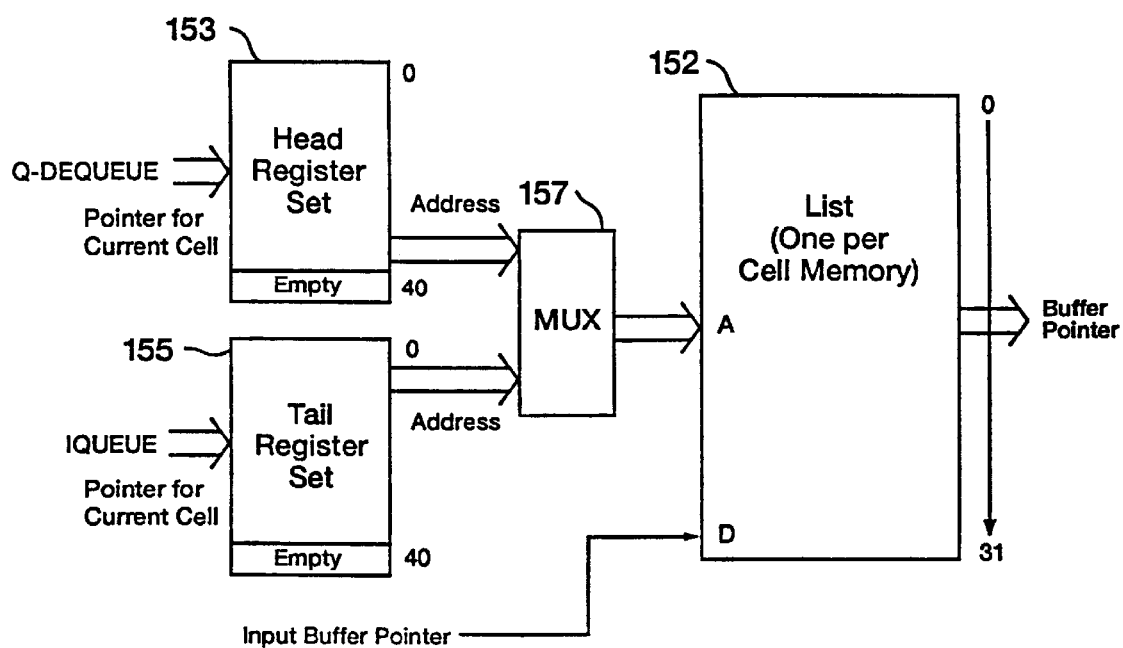
FIG. 6 is a block diagram showing an address multiplexer coupled to a linked list controlling a buffer pointer according to the invention.

Referring to FIG. 5, MPBPC 150 uses its linked list RAM 152 to maintain five First-In/First-Out (FIFO) queues by means of lists of pointers to the next entry in the cell memory for each of the five output lines for a total of 40 possible virtual queues. FIG. 6 is a representation of the linked-list RAM 152 and associated head register set 153 and tail register set 155 for the forty queues defined for the 32 cell memories accounted for in the list RAM 152. For each of the forty queues, a buffer pointer is constructed from the head address of the queue and tail address of the queue for one of the forty queues stored in the head register set 153 and the tail register set 155. A head pointer and a tail pointer is kept for each one of the forty queues. The forty queues share a linked list of up to thirty-two entries. Each entry can identify one of the thirty-two cell memories in cell buffer pool 100. The linked-list thereby specifies which cell memories are part of each queue in FIFO order. Cells are enqueued onto the tail of the proper queue and dequeued from the head of the proper queue in accordance with a queue service procedure which generates the Q-dequeue pointer value to the head register set 155 and the Iqueue pointer to the tail register set 155. A mux 157 switches between register sets, depending on whether the procedure calls for enqueuing or dequeuing a cell. An input buffer pointer specifies where the input cell is currently stored, and the output pointer designates where the cell is to be directed.

The queues for one output line are assigned five different priorities. Three of the queues are proportional bandwidth queues of equal priority but having an assigned bandwidth of $5/8$, $2/8$ ($1/4$), or $1/8$. Of the remaining two queues, one is designated a high-priority queue which may be used for very time dependent data such as voice, and the other a multicast queue which is used for data being sent from one transmitting workstation to more than one receiving workstation which might be the case in video conferences.

It will be seen that while there are forty possible virtual queues definable by MPBPC 150, only up to thirty-two queues may be active at any one time because there are only thirty-two available cell buffer pool memories. In practice fewer than thirty-two queues may be active at any one time, because it is likely that there will always be some queues which are using more than one cell memory.

Multipriority buffer pool controller (MPBPC) 150 controls the overall function of the switch element 40 as follows. During each cell cycle, cells having a length of 118 nibbles may be received on any or all of the eight input lines. Prior to the start of a cell cycle, the controller 150 has specified which input line is connected to which cell memory via an input crosspoint block 110 by setting bits in input controller 130. The first twelve of the 118 nibbles from each input line are read by input bus controller 130 and transmitted to the multipriority buffer pool controller 150 while the ATM cell is being stored in its designated cell memory. From these tags, MPBPC 150 determines the priority and destination of the cell that has just been stored in each of the eight cell memories connected to one of the input interfaces. The MPBPC 150 then adds the cell memories to their appropriate queues by updating its linked lists. The MPBPC 150 then determines which of the output interfaces to which cells are directed can receive the cells during the next clock cycle. An output interface may be unavailable to receive all of the data which is directed towards it during a cycle when more than one input lines are directing cells to a single output interface, or when the output interface has asserted back-pressure to the MPBPC 150. The MPBPC 150 handles the problem of output interfaces being unavailable to receive cells by establishing queues for the connections for which output lines are temporarily unavailable in the cell buffer pool 100. Cells may be stored in these queues in a first-in-first-out FIFO fashion for some number of cell cycles until the output interfaces are available for outputting the cells. Once the MPBPC 150 has made determinations regarding which cells can be transmitted to their destination output interfaces during the next clock cycle and which cells will be stored in queues in the cell buffer pool 100, it directs the output interfaces to receive data from cell memories in the cell buffer pool by sending control signals to output bus controller 140. It also directs the input interfaces to available cell memories by sending input control signals to input bus controller 130.

BACK-PRESSURE CONTROL

One problem that may arise in a switch element 40 as packets are being routed through cell memories from input lines to output lines is the unavailability of cell memories for queuing prior to a clock cycle when new cells may be received on the input interfaces. If a cell is received at an input interface to the switch element when no cell memory is available to receive the cell, the cell must be dropped and the data resent.

In accordance with one aspect of the invention, each switching element 150 avoids dropping cells by issuing back-pressure signals to each connection to each of its input interfaces on a per-input, per-priority basis to halt the flow of cells having a given priority to a given input. Back-pressure is asserted for a given input and given priority whenever the number of currently enqueued cells of the given priority supplied by the given input exceeds a predetermined threshold. Back-pressure for a given priority is also asserted for all inputs whenever the total number of available cell memories falls below a threshold associated with that priority.

By employing a shared buffer pool, the switching element of the present invention virtually eliminates the deletion of cells due to exhaustion of available memory. In many ATM applications, even infrequent cell drops are harmful in that the loss of one cell necessitates the retransmission of many cells, substantially reducing network efficiency. Furthermore, in the event of excessive cell traffic through a switching fabric, it is preferable that cell drops occur at a routing table rather than at a switching element, since routing tables employ sophisticated congestion management strategies unavailable at a switching element when dropping cells. (One such sophisticated congestion management strategy is the standard ATM Adaption Layer 5 (AAL5) early frame discard technique, AAL5 being a technique for segmenting frames into cells.)

Figure 7:
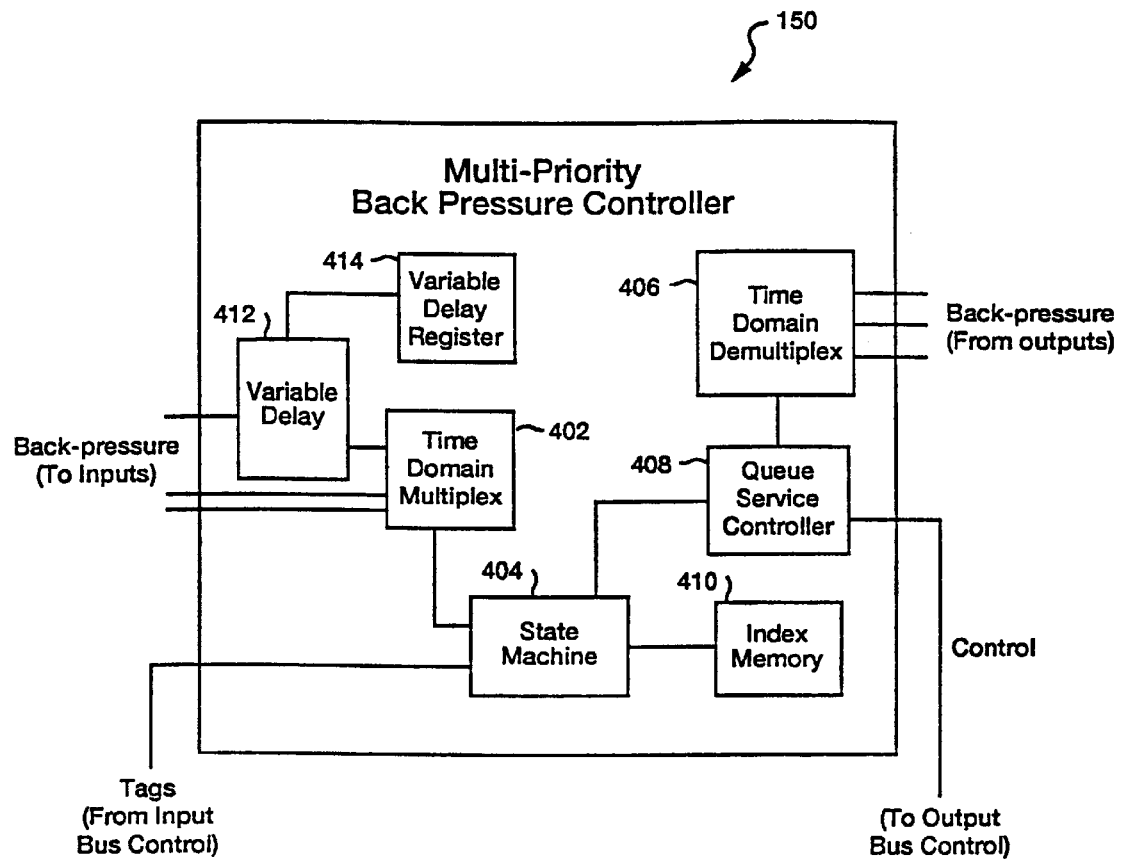
FIG. 7 is a block diagram of a back-pressure controller according to the invention.

FIG. 7 is a simplified representation of the elements within back-pressure controller 150 used to implement the back-pressure capability. Back-pressure controller 150 includes a time domain multiplexer 402, a state machine 404, a time domain demultiplexer 406, a queue service controller 408, an index memory 410, a variable delay circuit 412, and a variable delay register 414. Back-pressure signals are generated by state machine 404 based on criteria as discussed below. Back-pressure signals from other switching elements or a routing table are received by a queue service controller 408 which selects cells for output.

Back-pressure is asserted for a given input and given priority whenever the number of currently-enqueued cells of the given priority supplied by the given input exceeds a predetermined threshold. A problem is posed in that queues, with the exception of the multicast queue, are organized by output rather than input. To maintain a count of enqueued cells for each input and priority, index memory 410 is maintained within the back-pressure controller 158 with an entry for each cell memory location which identifies the source of the cell stored there. When a new cell is enqueued, index memory 410 is updated and a counter, internal to state machine 404 and associated with the source and priority of the cell, is incremented. When a cell is dequeued for output, the index entry for that cell is read to identify the source for that cell and the appropriate counter is then decremented. To determine the necessity of back-pressure for a given input and priority, the counter for that input and priority is compared to a predetermined threshold.

The predetermined threshold is the same for each input and priority. Thus, back-pressure is allocated among inputs so that no one input blocks incoming traffic from other inputs by occupying a disproportionate share of the cell memory locations. When inputs are aggregated, a counter is maintained for each priority for the aggregated inputs as a group rather than for each input.

To assure that availability of cell memories is also properly allocated among priorities, a count of empty cell memories is maintained within state machine 404 and compared to thresholds stored for each priority. When the number of empty cell memories falls below the threshold associated with a given priority, back-pressure is asserted for that priority for every input. The higher priorities have lower thresholds set so that high priority traffic is impeded last as the count of available cell memories decreases. In addition, the thresholds are normally set so that high-priority traffic has strict priority over lower priority traffic.

In one embodiment of the present invention, back-pressure signals for the various priorities are time-domain multiplexed together by time-domain multiplexer 402 so that each input is provided with a single back-pressure signal. Received back-pressure signals are demultiplexed by time domain demultiplexer 406. Each priority then corresponds to a different time slot within the time-domain multiplexed back-pressure signal.

Figure 8A:
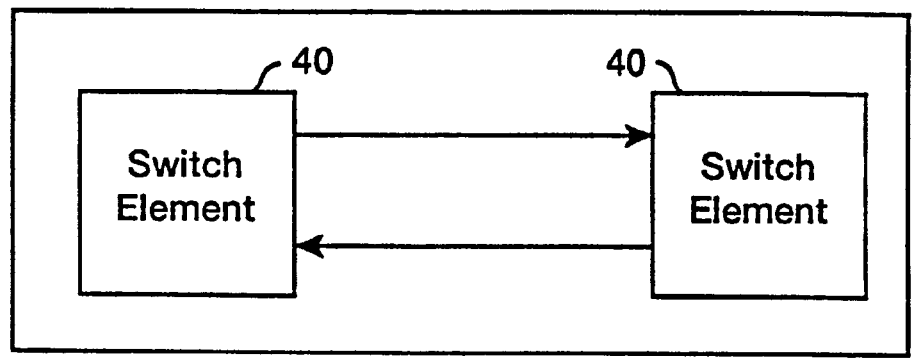
FIG. 8A and FIG. 8B are block diagrams of configurations for switch elements circuits with back-pressure control.
Figure 8B:
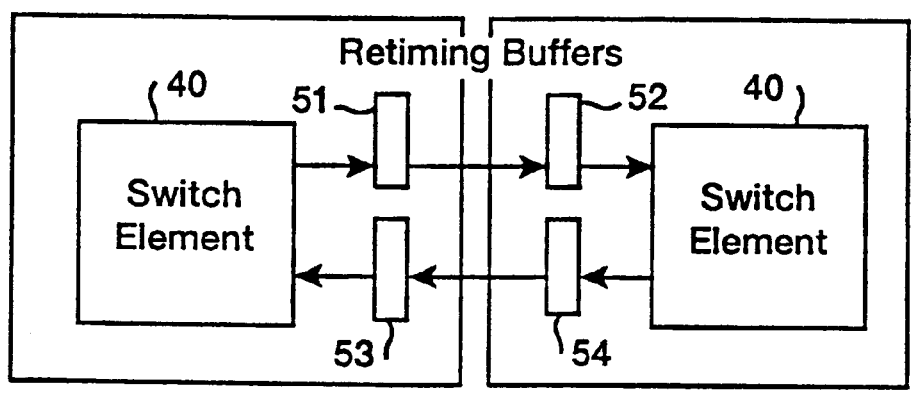

A switching element and an associated input device (switching element or routing table) may or may not be on the same printed circuit board. A problem arises in that if the devices are on the same printed circuit board, no delay is required on the interconnecting data or back-pressure lines while if the devices are on separate printed circuit boards, the interconnecting lines may be retimed with D flip-flops. FIG. 8A and FIG. 8B are a simplified representation of these two situations. A set of retiming buffers 51–54 compensate for inter-card delays. To compensate for the resulting delays, a switching element 40 according to one embodiment of the present invention is provided with internal means for establishing a variable delay in the back-pressure line. FIG. 7 shows variable delay circuit 412 inserted in one of the back-pressure lines. The variable delay is selected by writing to variable delay register 414 within the switching element.

AGGREGATE BITS

Figure 9:
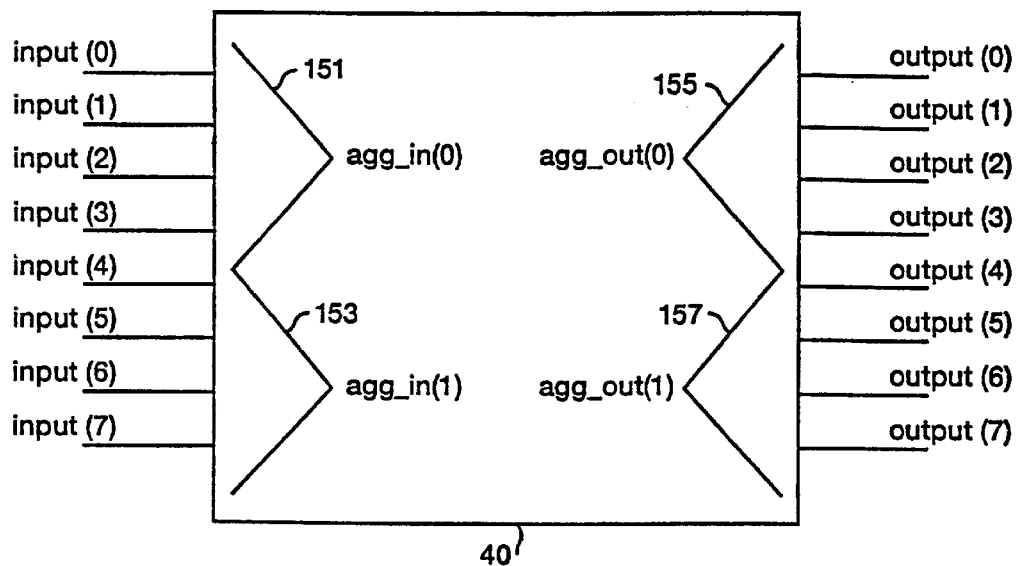
FIG. 9 is a block diagram of an aggregate bit controller.

Referring to FIG. 9, a switch element 40 includes two aggregate input bits, agg__in(0) 151 and agg__in(1) 153 and two aggregate output bits, agg__out(0) 155 and agg__out(1) 157, which may be set by the configuration controller (not shown) to allow for aggregating either the group of inputs I0 to I3, the group of inputs I4 to I7, the group of outputs O0 to O3, or the group of outputs O4 to O7. Referring back to FIG. 3, some types of digital devices, particularly other switching systems, such as server computer 52, may need to transmit data through the switch fabric at a higher rate than may be provided by one switch element input, e.g., at the 622 Mbps rate provided by a conventional OC-12 ATM interface. FIG. 9 shows the groupings of inputs and outputs of a switch element 40 when the signals agg__in(0) and agg__in(1) and agg__out(0) and agg__out(1) are set. Switch element 40 has two bits for input lines and two bits for output lines that signal the switch element when a set of four of its input lines is being configured as a single input which receives four cells at once and retains FIFO order. Input bits agg__in(0) and agg__in(1) are set in the multipriority buffer pool controller 150 via the configuration bus .

When bit agg__in(0) is set true, inputs 0 through 3 are treated as if they are a single stream of cells. This makes the input capable of handling data at an effective rate four times higher than possible on one input line, which in one specific embodiment is 622 Mbps. With this feature, a switch element 40 can support a mixture of data rates on its inputs.

A key problem that must be addressed when aggregating input lines is maintaining FIFO order between the cells that arrive simultaneously. When the inputs are not aggregated, the cells from each input are enqueued separately. When the inputs are aggregated, then the cells are enqueued as if they were from a single input with the cell received on input 0 placed in the single aggregated FIFO queue first, the cell received on input 1 placed in the single FIFO queue second, and so on. In the absence of the aggregate bit, FIFO order could be violated as the MPBPC 150 uses a round-robin procedure to enqueue multicast cells to improve fairness. This procedure intentionally chooses cells from the inputs in differing orders from cell time to cell time.

A second problem that the invention addresses is that cells bound for an aggregated output can go out any one of the outputs in the aggregated output, depending on availability. When the aggregate bit is set, cells bound for the aggregated output are dequeued for any one of its outputs. The MPBPC 150 also uses the aggregate bit to determine how to assert back-pressure to an output from the previous stage in an aggregated input. Back-pressure is given if cells from a given input are queued excessively.

When inputs are aggregated to boost effective speed from 155 Mbps to 622 Mbps, the MPBPC 150 measures the counts of the cells from any of the inputs in the aggregated input, rather than from the individual inputs. The back-pressure is then applied to all of the inputs in the aggregated input, rather than the individual inputs. More specifically, to aggregate, in the first level of the switch fabric (FIG. 2), the agg__in value is set for all inputs actually connected to a high speed input. Agg__out is set for all possible destinations of the inputs that agg__in is set for. In subsequent levels, agg__in is set for those links which have agg__out set in the previous level. Thus agg__out is set for all possible destinations of an input in which agg__in has been set. In the last level, agg__in is set for those links which have agg__out set in the previous level. Agg__out is set for those links which are actually connected to a 622 Mbps output port.

PROPORTIONAL BANDWIDTH QUEUES

Switch elements 40 and the routing table circuits 30 can also support proportional bandwidth queues. Proportional bandwidth queues solve a problem that arises when data traffic from sources of drastically different bandwidths coexist on an intermediate link. In one specific embodiment of the invention, the switch element 40 and routing table circuit 30 can support for example three queues that are of equal priority but which have bandwidths of ⅛, ¼ and ⅝ of the available bandwidth. MPBPC 150 maintains a service order table 154 (FIG. 10) which enhances fairness among connections having different bandwidths. The assigned proportions can be adjusted by externally altering the contents of the service order table 154.

The proportional bandwidth queues are implemented by the MPBPC 150 by having a service order table 154 for the dequeuing process that specifies the order of queue service for each of the output queues. The schedule in each stage is delayed by one cell period which tends to minimize queuing and thus the cell memories required by trying to dequeue a cell from a given queue just after a cell from that queues is likely to have arrived. MPBPC 150 must make sure that all of the possible competitions between differing bandwidth queues turn out as predicted. For example, if cells only in the ⅛th and ¼th queues arrive, then the ⅛th queue should get ⅓rd of the available bandwidth on the output channel, and the ¼th queue should get ⅔rd of the bandwidth. Similar results should apply for all of the possible x-way competitions. These issues have been addressed by a careful design of the service order table 154 stored within MPBPC 150. This table 154 provides each of the participants in the possible competitions with approximately the proper bandwidth while reducing overhead processing that must be done by the MPBPC 150 to determine dequeuing order. Additionally, the MPBPC 150 can update the service order table 154 on the fly so that moment-by-moment adjustments may be made by certain types of switching systems that will use these devices to enhance fairness in competition.

Figure 10:
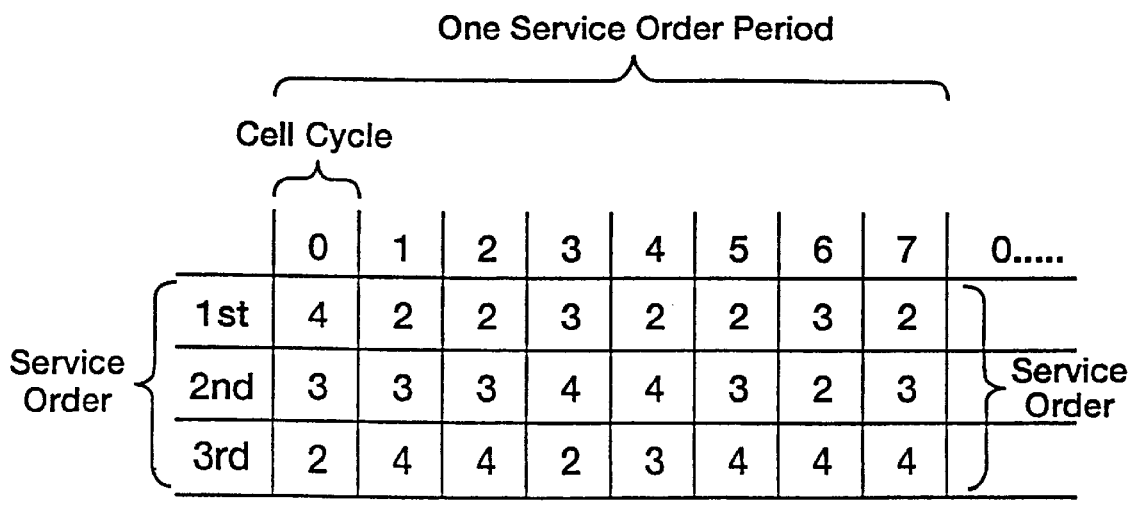
FIG. 10 is a table illustrating service order for one service order period.

As a further detail, FIG. 10 shows a service order table 154 stored in MPBPC 150 for determining dequeuing from cell buffer pool 100 when more than one proportional bandwidth queue is queued for a given output. The MPBPC 150 defines a service order interval of eight cell transmission cycles for determining the priority of serving the proportional bandwidth queues. These cycles are represented by the eight columns labelled 0 to 7 in FIG. 10. During any given cycle, MPBPC 150 examines which queues for a given output wish to transmit data to that output. It will be seen that during any given cycle there is a queue service order listing the priority with which bandwidth queues will be serviced. During any cycle, only one queue is serviced and that queue is the queue having the highest priority, 1st through 3rd, as listed in the service order table during that cycle. For example, during cell cycle 4, the priority list is 3, 4 and 2. Should cells from two proportional bandwidth queues both be ready to transmit during cycle 4, the cell from the queue having bandwidth of the higher priority will be transmitted. During the next clock cycle, cycle 5, if both of those queues wish to transmit, the next bandwidth queue will be transmitted because the queue service order table shows that it has a higher priority during that cell cycle.

MULTICAST

One data transmission application which the present invention may be employed to support is multicast transmission. During multicast transmission, data from one source is distributed to several destinations, i.e., the multicast group, which comprise some, but not necessarily all, of the possible switch fabric outputs. An example of such an application is a video conference over a network in which several workstations are connected by a switch fabric, and voice and image data are transmitted from each workstation to each of the other workstations.

Figure 11:
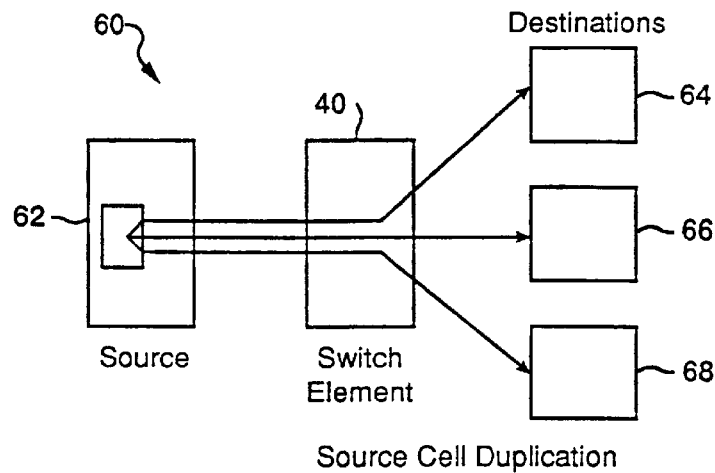
FIG. 11 is a block diagram showing the source cell duplication multicasting of the prior art.

Generally, multicast may be supported in a variety of ways. Source cell duplication is a simple, but brute-force solution to the multicast support problem. FIG. 11 is a simplified representation of the source cell duplication solution 60 known in the prior art. With source cell duplication, the source 62 of the data cells creates copies of each cell for transmission to each destination. This solution suffers from a number of significant disadvantages. Not only does the task of duplication place a severe load on the source 60, it also places limits on the number of destinations 64, 66, 68 in the multicast group connected by a switch element 40. As a result, the size of the multicast group for a network which supports multicast may be drastically limited (e.g., to half the size of connection for the network). Additionally, expensive bandwidth is wasted. For example, in cases where more than one destination is at the same distant location, redundant copies of the information are transmitted over the entire distance, thereby unnecessarily contributing to system traffic.

Figure 12:
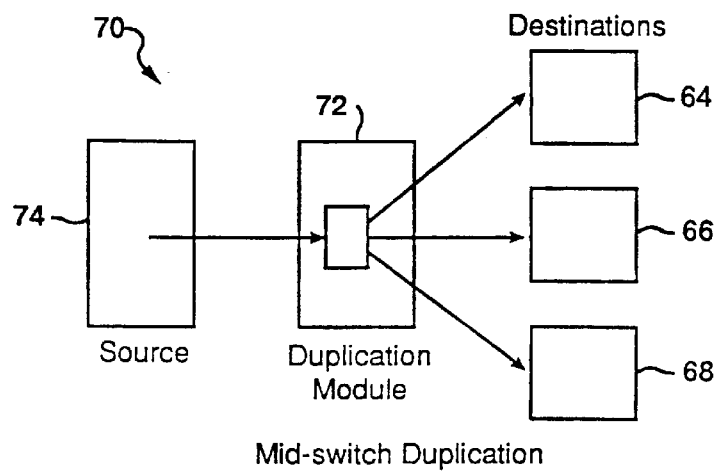
FIG. 12 is a block diagram showing mid-cell duplication multicasting according to the prior art.

Mid-switch cell duplication 70 is an alternate multicast support solution. A simplified representation of a mid-switch duplication 70 solution is shown in FIG. 12. According to a typical mid-switch duplication 70 solution, a module 72 is provided at some point in the switching system which duplicates the transmitted cells from a source 74 as necessary for distribution to destinations 64, 66, 68 in the multicast group. Although this solution does not suffer from all of the disadvantages of the source cell duplication solution 60, bandwidth is still unnecessarily consumed by the transmission of the cell duplicates through the remainder of the system.

Figure 13:
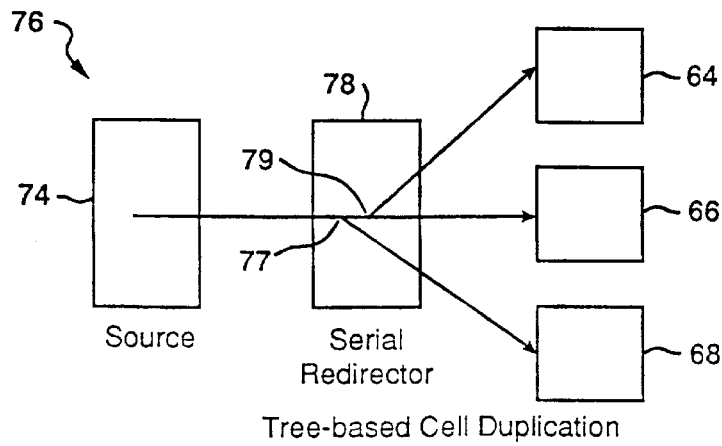
FIG. 13 is a block diagram showing mid-switch duplication multicasting according to the prior art.

The optimal solution for supporting multicast, made practicable by the present invention, is referred to as tree-based cell duplication. A simplified representation of a tree-based cell duplication system 76 according to the invention is provided in FIG. 13. With a tree-based cell duplication system 76, the transmitted cells are not duplicated until the last points of divergence 77, 79 to the destinations 64, 66, 68, e.g., by means of cell replication within the switch element 40, represented herein as a serial redirector 78. This avoids the unnecessary consumption of bandwidth encountered with the previously described solutions. One possible complication of this solution, however, is that all destinations 64, 66, 68 of a multicast cell may not be reachable with a cell having the same address.

Figure 14:
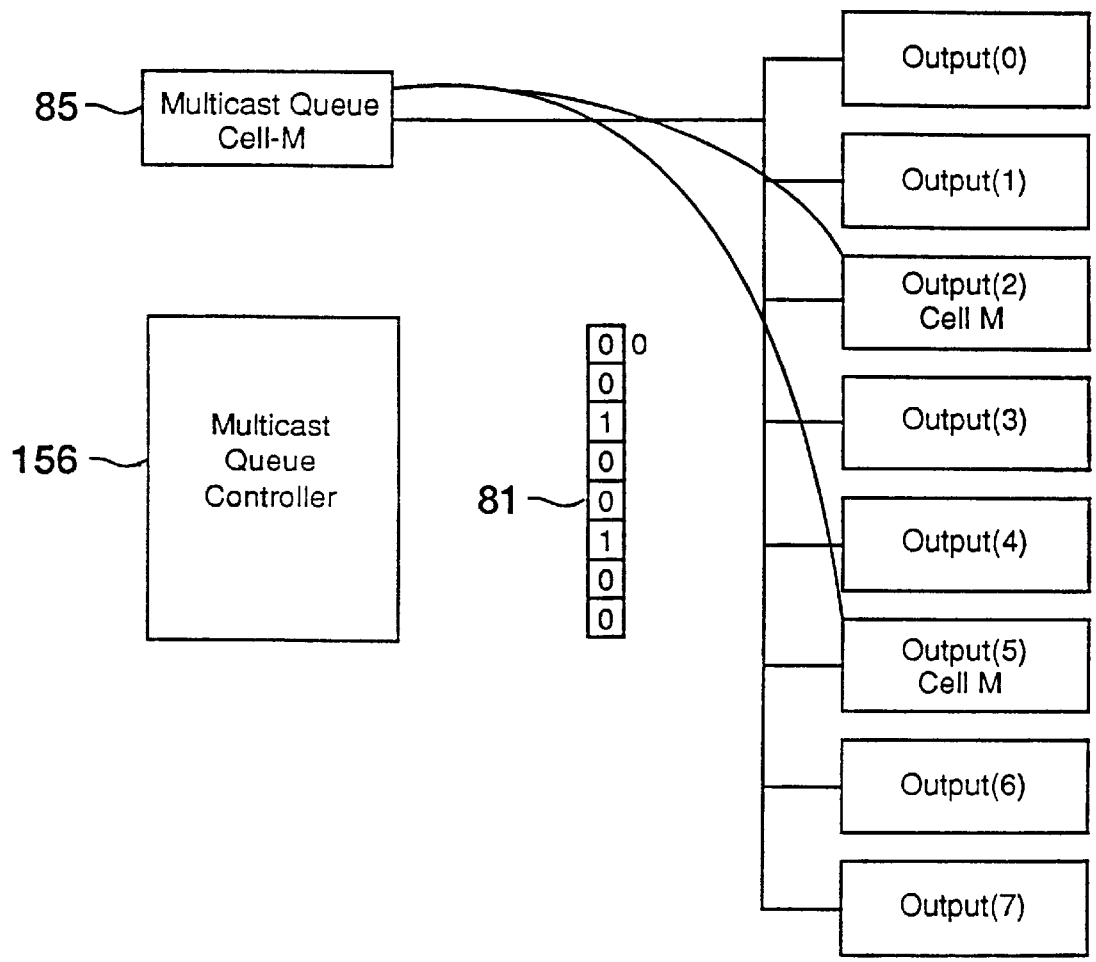
FIG. 14 is a block diagram showing tree-based duplication multicasting according to the prior art.

The present invention implements a tree-based cell duplication system 76 using a specific embodiment of the switch element 40 described above. The solution is described with reference to FIG. 14. An eight-bit field in the routing tag of each transmitted cell determines what is called the multicast group for that cell. As described above, the routing tag, a twelve-nibble field placed on the front of a cell by the routing table circuit based on the content of a multicast group bit register 81, dictates the path of the cell through the switch fabric. The multicast group consists of the group of network destinations to which the cell is to be transmitted. For each switch element, the multicast group field determines which switch element outputs upon which a received cell is to be placed in order to get the information to the desired destinations.

The switch element of the present invention stores an array of multicast group bits in its RAM, the array including one eight-bit word for each of the multicast groups. Each bit in each word represents one switch element output. When the multicast queue of the switch element is selected and a data cell placed therein (as determined by a one nibble field in the routing tag), the multicast group field in the cell is used as an index into the multicast group bits array, pointing to a particular word in the array. Any bits which are set in the selected word correspond to the switch element outputs on which the cell in the multicast queue is to be placed.

MULTICAST COMPLETION

One difficulty encountered in multicast transmissions is that it is often not possible to place a given cell on all of the desired outputs simultaneously. This is referred to as the problem of multicast completion. Such a situation might arise, for example, if a cell from a higher priority queue has already been placed on the selected output. This situation can also occur if a subsequent switch element has exerted back-pressure on the selected output, thereby preventing the transmission of cells from that output. Some open loop switching systems simply allow cells to be dropped if congestion causes cell buffers to overflow. If this occurs with the transmission of video information, for example, the penalty incurred from such a drop is relatively high. An entire video frame might be lost due to the loss of just one cell. Other penalties are incurred if the system protocol requires the retransmission of the entire frame or a series of frames.

Figure 15:
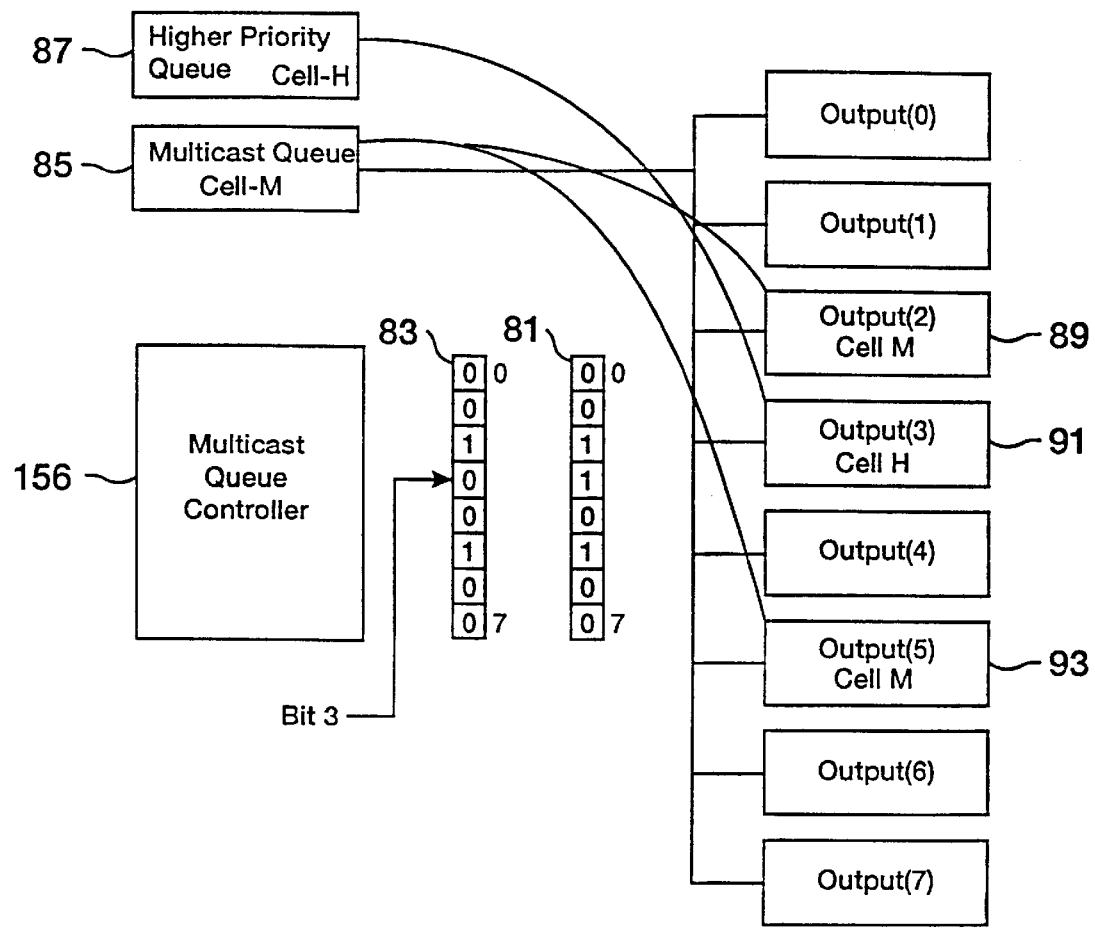
FIG. 15 is a block diagram showing tree-based duplication multicasting according to a specific embodiment of the present invention.

The switch element 40 of the present invention solves this problem by keeping a record of the switch element outputs upon which the cell in the multicast queue has been successfully placed. Referring to FIG. 15, multicast queue controller 156 of switch element 40 sets bits in a multicast queue completion register 83 for each output on which the cell is actually placed. The ATM cell in the multicast queue is dequeued only when the bits in the completion register 83 match the bits in the word selected from the multicast group bits array stored in the multicast group bits register 81. As indicated by the multicast group bits word, cell M 85 in the multicast queue is to be placed on outputs (2), (3), and (5) 89, 91, 93. However, cell H 87 in the higher priority queue has already been placed on output (3) 93, thereby preventing immediate placement of cell M 85 on that output 93. This is reflected by the fact that bit number 3 in the completion register 83 (corresponding to output (3) 93) has not yet been set. When cell M 85 is eventually placed on output (3) 93, this bit 3 is set. The word in the completion register 83 then matches the word from the multicast group bits array 81, allowing cell M 85 to be dequeued.

PER PRIORITY QUEUING WITH PER CONNECTION COUNTS

As described above, the routing table circuit 30 of the present invention receives a cell from a source, looks up the intended address in its RAM, adds the appropriate routing tag to the cell, and then puts the cell out onto the switch fabric via the switching elements. The routing table circuit 30 also performs a queuing function in which it stores queued cells in an accompanying SRAM before placing them on the switch fabric. The routing table circuit 30 of each source queues the cells on a per priority basis, but also keeps track of how many cells from each connection are in the queue at any given time. Unlike a strict per connection queuing discipline, a transmission scheduler is not required.

FIG. 16 is a table which illustrates the manner in which the routing table queues incoming cells. In the illustrated example, cells having priorities 0, 2, and 5 have been queued by the routing table. Within each of the priorities, cells from different connections have been queued. The count of queued cells per connection is maintained as shown in FIG. 17, showing the number of queued cells for each VPC. The routing table uses the connection count to perform closed loop functions such as sending a back-pressure signal to a particular data cell source. Thus, with the present invention, the simplicity of per priority queuing is enjoyed, while at the same time per connection queue depths are kept so that congestion management techniques can be employed.

MARKED INTERRUPT LINKED LIST

It is one of the functions of the routing table to alert the external processor that a virtual channel is experiencing congestion. One method for doing this is to generate an interrupt signal each time a congestion condition is encountered. However, it is not desirable to generate an interrupt every time a data cell is queued for a congested channel, especially if the processor has already been notified of the congestion on that channel. Also, more than one channel may experience congestion before the processor is able to respond to a congestion interrupt. It is therefore necessary to keep track of channels experiencing congestion so that the processor may take appropriate action for all such channels when it is ready to do so. One method for keeping track of congested channels includes assigning a bit for each of the channels, and setting the bits corresponding to channels which experience congestion. The processor then checks the bits for all of the channels to determine which channels are congested. However, because of the number of channels made possible by the present invention, such a solution is undesirably slow, consuming valuable processor time.

Therefore, according to a specific embodiment of the invention, the routing table maintains a linked list of currently congested channels. Each channel in the list is also marked (i.e., a "congestion" bit is set) so that the queuing of further data cells for those channels does not generate additional interrupts. When a data cell is queued for a particular channel, the current queue depth for that channel is compared with the configured congested queue depth. If the current queue depth is longer and the channel is not marked, the routing table generates an interrupt and the channel is marked and added to the end of the linked list. If the channel is already marked, nothing happens.

When the processor is able to respond to an interrupt, it first looks at the interrupt head pointer which points to an address which represents the first virtual channel in the linked list. The processor then reads from that channel the address for the next channel experiencing congestion. The processor continues to read the addresses for the channels experiencing congestion until it reaches the end of the linked list. The processor then takes appropriate action for each of the channels in the list to resolve the congestion. Such action might include, for example, sending an appropriate feedback message, or changing the queue depth which causes interrupts.

A congestion-relieved threshold is determined by multiplying the congestion threshold by a fractional constant (e.g., 0.75). And whenever a cell is dequeued, and the current queue depth falls below the congestion-relieved threshold, a second interrupt is generated, and the congestion is cleared.

A global "enable" for interrupts allows the system processor to read the linked list of congested channels atomically. If a channel becomes congested while the interrupts are disabled, once the interrupts are re-enabled, the next cell queued for that channel will cause an interrupt if the channel is still congested.

The invention has now been explained with reference to specific embodiments. Other embodiments will be apparent to those of ordinary skill in the art upon review of this description. It is therefore not intended that the invention be limited, except as indicated by the appended claims.

What is claimed is:

1. In an ATM switching matrix having a plurality of switching elements interconnected in a switch fabric architecture, each said switching element comprising:

a data input for receiving cells from an ATM cell output of a source, said source being a routing table or a data output of another of said switching elements;

a data output for sending cells to an ATM cell input of a destination, said destination being a routing table or a data input of another of said switching elements;

a cell buffer in data communication with said data input and said data output;

an input cross-point block coupled between said data input and said cell buffer;

an output cross-point block coupled between said cell buffer and said data output;

a back-pressure output able to be coupled to said source for issuing a back-pressure signal to said source to block transmission of cells by said source to said data input;

control means coupled to said back-pressure output for asserting said back-pressure signal responsive to congestion locally within said switch element; and a buffer control circuit coupled to said cell buffer and configured to control transmission of cells, said buffer control circuit further configured to receive a back-pressure signal from another of said switching elements and to control transmission of cells in response to a received back-pressure signal.

2. The switch element of claim 1 wherein said control means comprise a state machine.

3. In an ATM switching matrix having a plurality of switch elements interconnected in a switch fabric architecture, each said switch element comprising:

a cell input for receiving cells;

a cell output for transmitting cells having one of a plurality of priorities;

a cell buffer for storing cells:

a first cross-point block coupled to said cell input and to said cell buffer:

a second cross-point block coupled to said cell buffer and to said cell output:

a first back-pressure input for receiving an indication of back-pressure necessity for cells having a first priority;

means, coupled to said cell output and said first back-pressure input, for locally blocking transmission of cells having said first priority responsive to said indication of back-pressure necessity received on said first back-pressure input, said means configured to receive said first back-pressure input from another of said switch elements;

a second back-pressure input for receiving an indication of back-pressure necessity for cells having a second priority; and means, coupled to said cell output and said second back-pressure input, for locally blocking transmission of cells having said second priority responsive to said indication of back-pressure necessity received on said second back-pressure input, said means configured to receive said second back-pressure input from another of said switch elements.

4. The switching element of claim 3 wherein said first back-pressure input and said second back-pressure input are derived from a single time-domain multiplexed back-pressure input signal.

* * * * *